Dec. 18, 1951     H. R. SCHULZ     2,579,096
MACHINE FOR PACKAGING ICE CREAM AND SIMILAR FROZEN FOOD PRODUCTS
Filed Jan. 24, 1949     5 Sheets-Sheet 1

INVENTOR.
HERMAN R. SCHULZ
BY
*Fulwider & Mattingly*
ATTORNEYS

Dec. 18, 1951 H. R. SCHULZ 2,579,096
MACHINE FOR PACKAGING ICE CREAM AND SIMILAR FROZEN FOOD PRODUCTS
Filed Jan. 24, 1949 5 Sheets-Sheet 3

INVENTOR.
HERMAN R. SCHULZ
BY
Fulwider & Mattingly
ATTORNEYS

Dec. 18, 1951     H. R. SCHULZ     2,579,096
MACHINE FOR PACKAGING ICE CREAM AND SIMILAR FROZEN FOOD PRODUCTS
Filed Jan. 24, 1949     5 Sheets-Sheet 4
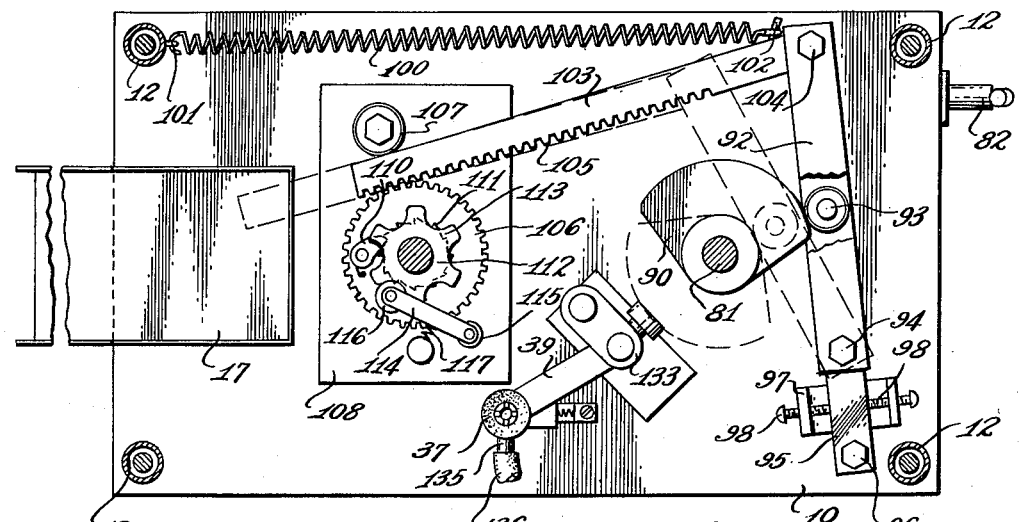
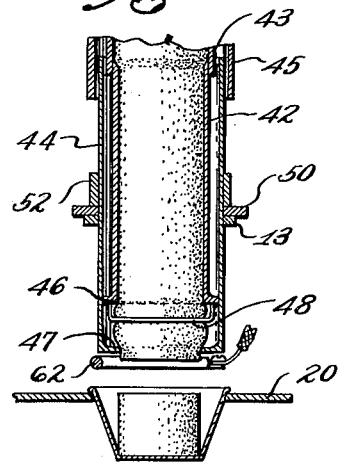
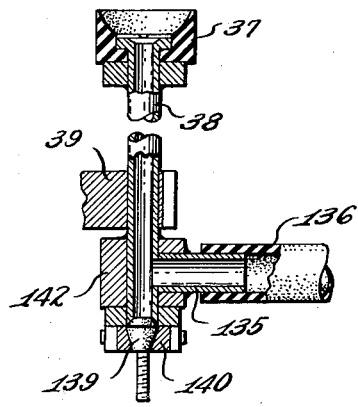
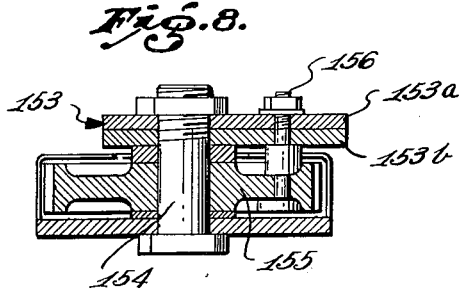
INVENTOR.
HERMAN R. SCHULZ
BY
ATTORNEYS

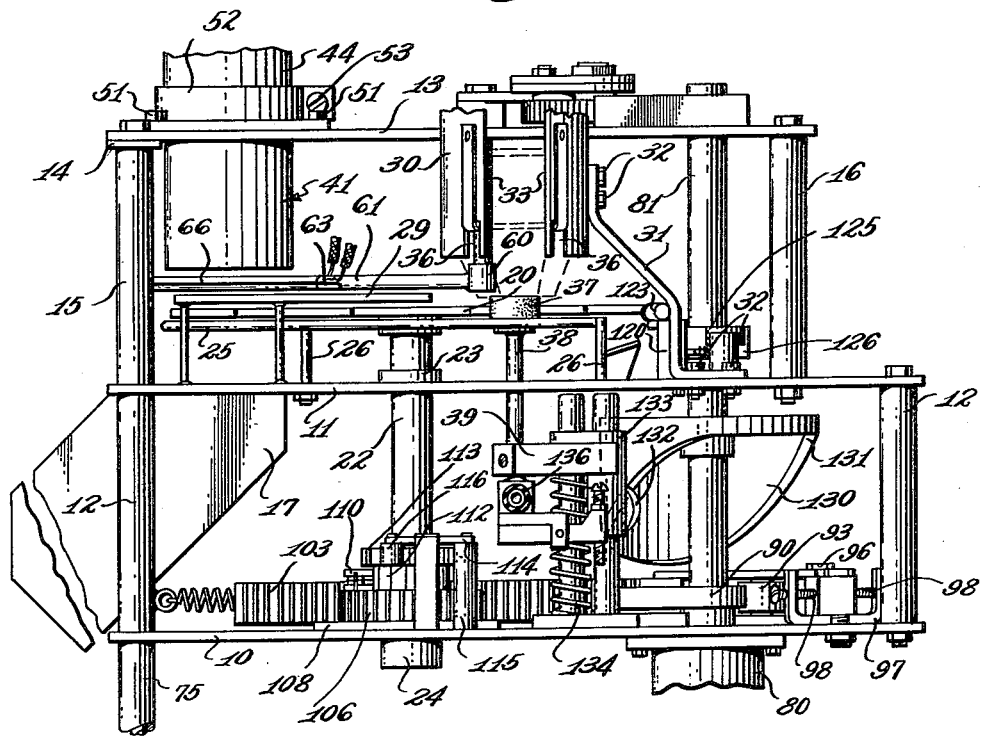

Patented Dec. 18, 1951

2,579,096

UNITED STATES PATENT OFFICE 2,579,096

MACHINE FOR PACKAGING ICE CREAM AND SIMILAR FROZEN FOOD PRODUCTS

Herman R. Schulz, Altadena, Calif., assignor to Redi Products Corporation, Pasadena, Calif., a corporation of California Application January 24, 1949, Serial No. 72,445

3 Claims. (Cl. 226—19)

1

This invention relates to machines for dispensing and packaging ice cream and similar foods and food products and has particular reference to machinery by which ice cream, or similar products, prepared in mass quantity, may be extruded in a shape retaining column from which individual portions are severed and automatically deposited into packaging receptacles ready for further freezing, transport, storage and serving.

More particularly this invention relates to a machine which may be employed to practice the packaging method described and claimed in the co-pending application of Herman R. Schulz, Carl G. Schulz, and Adam Stuart Kedzie, Serial No. 73,782, filed January 31, 1949.

In the application above referred to there is described a method of preparing ice cream and similar frozen food products wherein ordinary commercial freezing methods are employed to prepare, freeze and aerate the product in mass quantities. The method includes also the ejecting or extruding of the prepared product immediately from the freezer through a spout or orifice, through which the product is forced after having been frozen in the freezer to such consistency that the product will not flow by gravity but is instead shape-retaining. The extruded product is cut or severed into individual portions immediately as it comes from the spout and each of the severed portions falls into an individual packaging receptacle presented in synchronism with the operation of the cutter. Then the unit comprising the portion and its receptacle are immediately further frozen to a hard consistency for storage, transport and future serving.

It is therefore an object of this invention to provide a machine which will extrude the stiff-frozen product without loss of aeration or fineness of crystalline structure captured in the freezer and to sever lengths from the extruded product to form individual portions ready for packaging.

Another object of this invention is to provide a machine of the type set forth above in which the spout or orifice shapes the product into a stream or column of predetermined cross sectional shape and dimensions and in which a cutter is operated in coordinated relation with the speed of movement of the column to cut therefrom predetermined lengths to form individual portions for packages.

Still another object is to provide, with the apparatus set forth in the preceding paragraph, a feeding mechanism which will automatically successively dispose a cup, receptacle or other

2 packaging element immediately under the column as successive portions are severed to catch the portions as they fall from the column of the product.

A still further object is to provide a machine as set forth above in which the successive presentation of the package element is synchronized with the operations of the cutter and to center the bottom of the package element immediately below the longitudinal axes of the column to insure the resting of the portion on its bottom without toppling over.

Numerous other objects and features of the present invention will be apparent from a consideration of the following specifications, read in connection with the accompanying drawings, in which Fig. 1 is a front elevation of one preferred embodiment of the apparatus of the present invention;

Fig. 5 is a transverse horizontal section taken along the broken line 5—5 of Fig. 1;

Fig. 6 is a detailed vertical section of the dispenser tube taken along line 6—6 of Fig. 1;

Fig. 7 is a detailed vertical section of the receptacle serving device taken along line 7—7 of Fig. 1;

Fig. 8 is a detailed vertical section of the severing cam taken along line 8—8 of Fig. 3;

Fig. 9 is a fragmentary front elevation similar to Fig. 1 showing the parts in a different phase of the operating cycle of the device; and Fig. 10 is a wiring diagram for the device.

Figure 1:
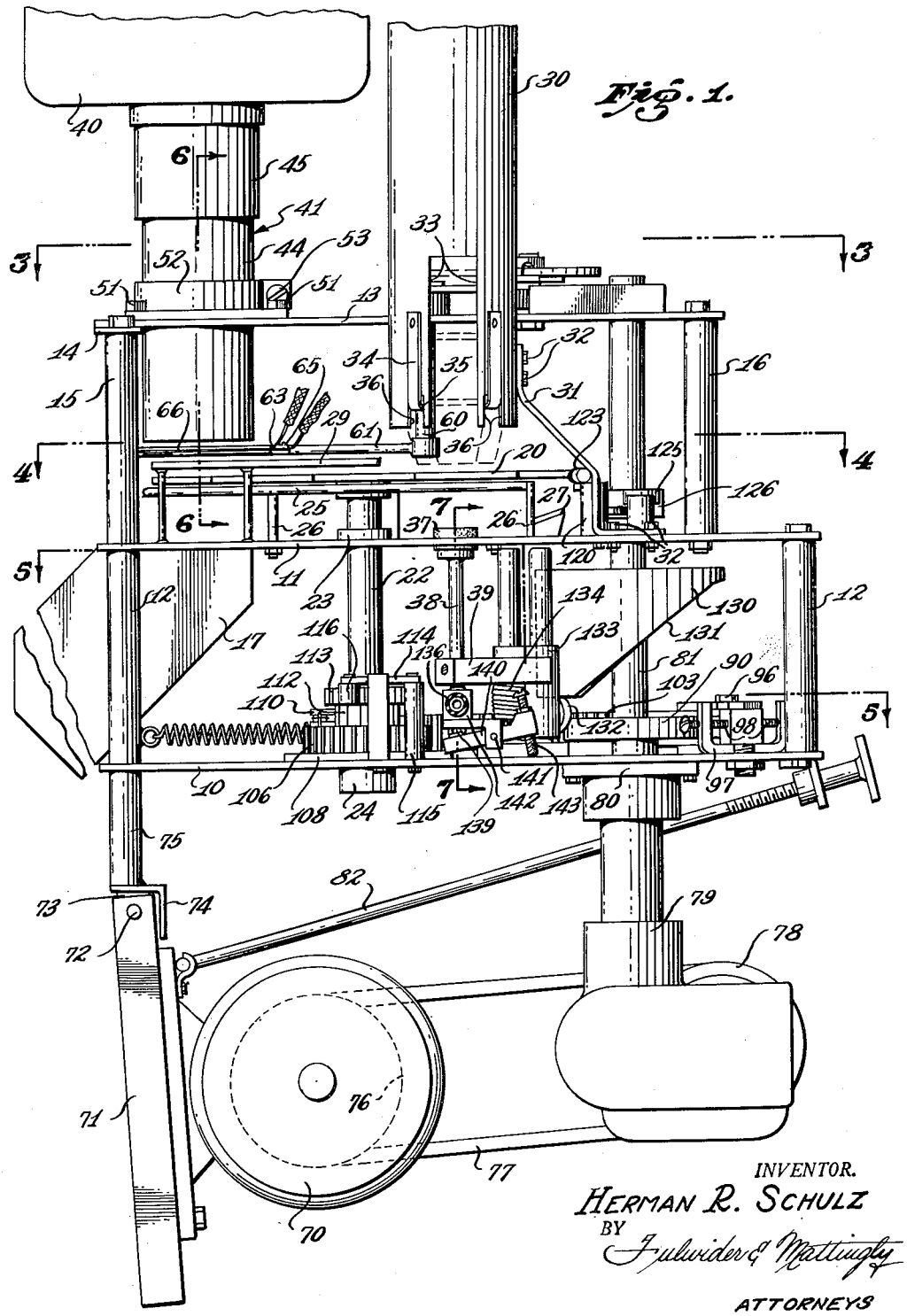

Referring more particularly to the drawing, there is illustrated one form of apparatus which may be employed in the practice of this invention, such apparatus comprising generally a dispensing apparatus indicated by the reference character 45, a receptacle or cup supply station indicated by a cup magazine 30 disposed in horizontally spaced relation to the dispensing station, and a turret or carrier for conveying the receptacles one at a time from the receptacle supply station to the dispensing station to there receive a portion of ice cream or similar frozen product.

The dispensing station 45 includes a spout in the form of a discharge tube 44 from which a shaped column of the product will be extruded from a supply chamber 40, which is preferably the exit end of a commercial batch or continuous ice cream freezer. The carrier 20 is mounted upon a shaft 22 supported for rotation between a pair of vertically spaced plates 10 and 11, the plate 10 being a bottom plate from which the top plate 11 is supported by corner stanchions 12, the space plates 10 and 11 providing a space for the location of power drive mechanism for actuating the carrier and cup feed mechanism. At the dispensing station 45, the top plate 11 is cut away and provided with a discharge chute 17 through which material may be discharged should no receptacle be present upon its severance. A super structure, or deck comprising a centrally located longitudinally extending narrow bridge 13 is mounted in horizontal spaced relation over the top plate 11. The left-hand end (as shown in Fig. 1) of the bridge 13 is supported by a transverse cross bar 14 supported at the left end of the device by extensions 15 of the left-hand corner stanchions 12. The opposite end of the bridge 13 terminates short of the right-hand end of the top plate 11 and is supported by intermediate stanchions 16. The spacing here shown of the bridge 13 over the top plate 11 is substantially equal to that between the bed 10 and the top plate 11. The intermediate space between top and bridge constitutes an operating area in which an indexing carrier is located.

The indexing carrier comprises a horizontally disposed carrier plate 20 having six equally spaced peripheral notches 21 in which receptacles may be transported from a receptacle supply means to the dispensing station and thence to discharge from the apparatus. In that form of the invention here shown, six equally spaced peripheral notches 21 are provided. The carrier plate 20 is mounted upon and fixed for rotation with a carrier spindle 22 journaled in the base 10 and top plate 11. If desired, antifriction spindle bearing may be provided in the upper and lower bearing housings 23 and 24, respectively. For retaining and guiding receptacles for movement in the notches 21 of the carrier 20 there is provided a peripheral guide rail 25 supported by legs 26 from the top plate 11 and extending from the receptacle supply hereinafter discussed, past the dispensing station to extend over an extending product supporting apron 27.

For dislodging the filled receptacles from the notches 21 and delivering them to the apron 27, there is provided an inner ejecting cam plate 28 extending from a point near the carrier spindle 22 outwardly toward the apron 27 so that a receptacle moved from the dispensing station will be urged outwardly towards the apron. A cover plate 29 over the portion of the carrier between the receptacle supply station and the dispensing station is also provided to prevent inadvertent dislodgment of the receptacles.

Figure 3:
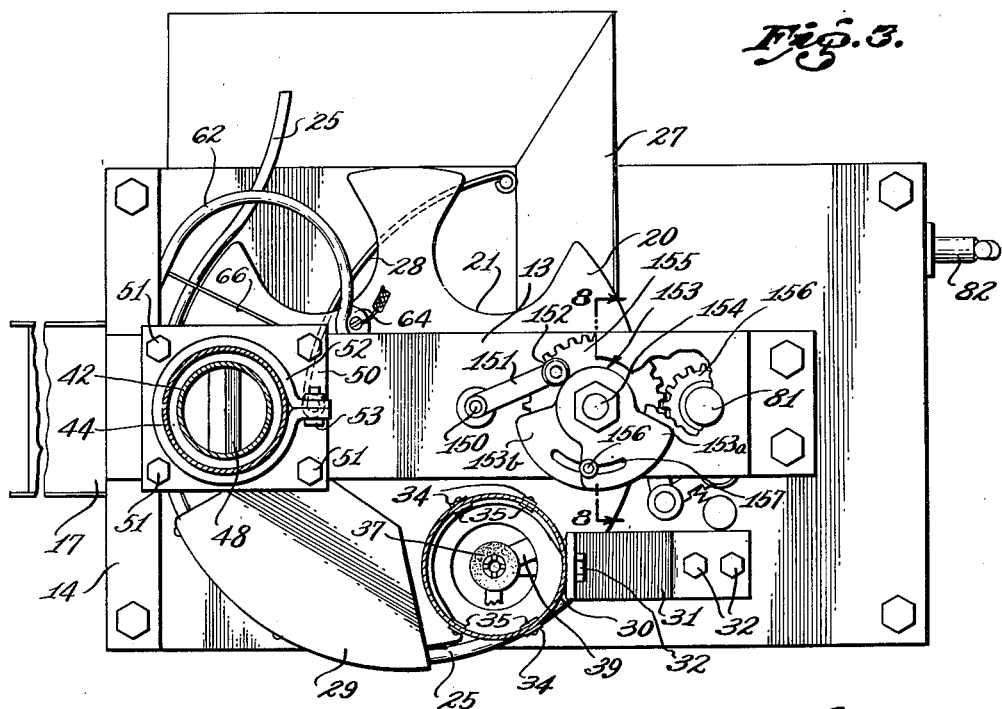
Fig. 3 is a plan view taken along line 3—3 of Fig. 1.

Receptacles for individual sequential delivery to the notches 21 of the carrier 20 are supplied from an open bottomed cylindrical receptacle magazine chamber 30 in which a nested series of receptacles is provided. The chamber 30 is mounted in vertical position over the top plate 11 at the forward side of the bridge 13 slightly to the left of the carrier spindle 22 as seen in Fig. 1. As indicated in Fig. 3 the lower open end of the chamber is in direct alignment with the path of travel of the notches 21 of the carrier plate 20. The chamber 30 is secured by an upwardly and inwardly extending supporting bracket 31. Bracket 31 is bolted or otherwise secured to the lower end of the chamber 30 and to the top surface of the top plate 11 by suitable securing means indicated at 32. For convenience in manually adjusting receptacles within the chamber 30, a longitudinal opening 33 is provided extending upward from the opened bottom of the chamber. Flexible fingers 34 are mounted at the lower end of chamber 30 having inturned end detents 35 which are received through end notches 36 of the chamber to frictionally engage the edges of the lowermost receptacle so as to restrain the receptacles against gravitational movement through the open lower end of the chamber.

The receptacles are individually removed from the nested stock within the chamber 30 and successively positioned in the notches 21 of the carrier 20 by a vertically reciprocating pneumatic gripper including a flexible cup-like head 37. The head 37 is mounted upon a reciprocating hollow suction tube 38 mounted for movement with its bracket 39 by operating mechanism hereinafter discussed.

At 120° in clockwise rotation of the carrier 20 from the chamber 30 and of equal radius from the spindle 22 there is provided a dispensing station. The dispensing station is thus located centrally between the side edges of the base 10 and top plate 11. At the dispensing station there is provided a material chamber 40 which, in the present form of the device is preferably any commercial freezer of either the continuous or the batch type provided suitable ejecting pressure mechanism is employed to force the product from the freezer under pressure to extrude through a dispensing tube assembly 41. Assembly 41 comprises an inner flow restricting cylinder 42 mounted for communication with an inner supply tube 43 of the chamber 40 and constituting a restricted passage for the flow of material from the chamber 40. Cylinder 42 is mounted within a supporting cylinder 44, the upper edge of which is fitted between an outer shell 45 of the chamber 40 and its inner supply tube 43. The lower end of the cylinder 42 is provided with an outward turned guide flange 46 which is fitted within the supporting cylinder 44. The open lower end of the cylinder 44 is formed with an inwardly extending annular restricting flange 47 downwardly spaced from the guide flange 46 of the cylinder 42. The restricting flange 47 constitutes a discharge opening for dispensing material from the chamber 40 and is suitably configurated to provide the final exterior configuration of the confection units which are to be successively severed from the column of material continuously fed through the tube.

A transversely extending baffle 48 is mounted within the space formed between the flanges 46 and 47 and is preferably of inverted V-shaped cross-section. The baffle 48 aids in the compacting of the material in the tube as it is supplied from the container 40 so that a compact and shaped column of the product is extruded from the cylinder 44.

The support for the tube assembly 41 is provided by the bridge 13. Cylinder 44 is mounted in an aperture of a supporting plate 50 secured by bolts 51 to the bridge 13. A split circular securing ring 52 surrounds the cylinder 44 and is clamped thereto by screw 53 to adjustably regulate the downward extension of the tube through the plate 50.

The ice cream or like material continuously extruded from the restricted end of the cylinder 44 is periodically severed into uniform portion units by a transversally moving severing means comprising a pivotally mounted arm 60. The arm 60 includes a straight shank 61 mounted on an operating shaft hereinafter described and a semicircularly bent end 62. The outer free terminus of the end 62 is substantially in line with the shank 61. Carried by the shank adjacent the bent end 62, there is provided a dielectric terminal block 63 having an electrical terminal clip 64 engaging the arm 60 to supply current thereto and a spaced terminal 65 to which is secured a severing wire 66. The severing wire 66 extends straight out from the shank 61 to the outer free terminal of the end 62 and is conductively joined with the end 62 at such free outer terminal. When current is supplied to the clip 64 and the terminal 65 the resistance of the thin severing wire causes the wire to become hot so that upon movement of the arm 60 across the path of material flow the hot severing wire will swiftly and cleanly sever a unit of material.

Power is preferably supplied to the device by a motor 70 mounted upon a pivotally suspended motor base 71. A transversally extending pintle 72 supported in bearing blocks 73 is carried by an angle iron supporting bracket 74 for supporting the base 71. Bracket 74 is mounted below the base 10 by end supporting rods 75 which form downward extensions of the left hand corner stanchions 12. The motor 70 is provided with a pulley 76 over which is trained a belt 77 which is also trained about a pulley 78 forming an extension of a gear housing 79. Housing 79 is supported below the base 10 from a bracket 80 through which extends the vertical main drive shaft 81 by which power from the motor 70 is delivered to the drive mechanism. Tension of the belt 77 may be conveniently varied by adjustment of a tension rod 82 by which the pivotal location of the base 71 may be altered to tighten or relax the belt tension.

The timing of the operations of the various instrumentalities including carrier movement, receptacle feed and material dispensing, is coordinated and accurately synchronized by mutually deriving actuating power from the shaft 81 driven by motor 70. By this arrangement it will be understood that the indexing of the carrier 20 is timed with the reciprocations of the receptacle serving device so that a receptacle is accurately located in each notch 21 of the carrier as the carrier comes to rest after its indexing motion. Likewise the severing device functions in sequence with the indexing of the carrier so that a unit of material is severed and dropped into accurate location within the receptacle during the pause between the indexing movements of the carrier. Similarly the carrier locating and locking device is timed with the operations of the receptacle feed and the severing means.

The carrier 20 is indexed by means of a cam 90 secured for rotation with the shaft 81. The cam 90 is of segmental character and upon rotation is adapted to oscillate the follower arm 92 which carries, intermediate its ends, a follower roller 93. The arm 92 is mounted on an adjustable pivot bolt 94 carried by a pivot block 95 which block is itself pivotally mounted to the base 10 by a pivot bolt 96. An adjusting U-shaped bracket 97 is provided secured with the block 95 to the base 10 by the bolt 96. The legs of the bracket 97 extend upwardly on either side of the block 95 each leg being provided with an adjustable set screw 98. The inner ends of the set screws 98 engage the side of the block 95 so that by adjustment of the screws 98 the block may be pivotally moved on its bolt 96 thus to change the location of the pivot bolt 94 of the arm 92. Since the amplitude of pivotal movement of the arm 92 is partially determined by the location of its pivot point with respect to the axis of the cam 90, it will be seen that adjustment of such pivot point will vary the amplitude of oscillations of the arm 92.

The arm 92 is normally urged towards counter-clockwise rotation, to the left, as shown in Fig. 5, by a spring 100 secured as at 101 to the rear left hand stanchion 12 and is secured at its opposite end to a hook 102 on the outer extremity of the arm 92. A rack 103 is pivotally secured to the outer end of the arm 92 by a bolt 104 the arrangement being such that oscillations of the arm 92, under the influence of the cam 90, will cause corresponding reciprocations of the rack 103. The teeth 105 of the rack 103 are in constant engagement with a gear 106 loosely mounted upon the spindle 22 of the table 20. A roller guide 107 is mounted on the index supporting plate 108 to bear against the back of the rack 103 to maintain enmeshment of the teeth 105 with the gear 106. Clockwise periodic rotation or indexing of the carrier 20 and its spindle 22 is provided for by means of a spring urged pawl 110 carried upon the upper face of the gear 106 and engaging ratchet teeth 111 formed on a ratchet member 112 which is rigidly secured for driving relation with the spindle 22. The ratchet member 112 also includes a recessed locator wheel 113 having notches therein corresponding in number and alignment with the notches 21 of the carrier 20. A locator arm 114 is mounted from the plate 108 by a support 115 and carries at its outer end a locator roller 116, compression spring 117 being provided to normally urge the roller 116 against the locator 113.

In the operation of the indexing mechanism, upon rotation in the shaft 81 the cam 90 will cause the arm 92 to be oscillated thereby imparting reciprocations to the rack 103 which reciprocations will impart characteristically reversed rotations of the gear 106. During the clockwise rotation of the gear, the paul 110 will engage the teeth 111 to rotate the spindle 22 in clockwise rotation while reversed rotation of the gear will cause the paul to slip over the teeth 111 without rotating the spindle 22 and thus the spindle is caused to periodically rotate, or index, the locator being operative to break the momentum of the spindle 22 at the end of each indexing rotation thereof and to frictionally retain the spindle in its index position.

It will be understood that the configuration of the cam 90 and the gear ratio between the rack and the gear 106 is such that upon each motion of the cam, the spindle 22 will be rotated 60° or 1/6 of a revolution so that the indexing will successively present the receptacle notches 21 of the carrier 20 to the receptacle supply station and to the dispensing station.

For more accurately locating the carrier notches at the end of each indexing movement, and for locking the carrier against inadvertent movement between indexing cycles, there is provided a carrier lock comprising a bell-crank 120 pivotally mounted as at 121 to be located in the plane of the carrier 20. The free arm 122 of the bell-crank is provided with a resilient tip 123 which is adapted to engage the forward facing inner wall of each notch 21 as the carrier terminates its indexing movement. The opposite arm 124 of the bell-crank is provided with a cam follower 125 which is urged against a cam 126 carried by the shaft 81 by means of a compression spring 127. The relation of the cam projection 128 of the cam 126 with respect to the cam 90 of the indexing mechanism is such that just prior to the outward, or driving, motion of the arm 92, the projection 128 will rotate the bell-crank in slight clockwise direction so as to disengage the end 123 from the notch 21 of the carrier 20 to permit the carrier to be rotated by means of the paul and ratchet arrangements hereinbefore discussed. Since the projection 128 is of slight angular extension, the follower will pass from the projection shortly after the indexing movement starts and will thus rest upon the outer circumference of the carrier 20 to be received within the next notch 21 and be in position to abut the oncoming forward inner edge of such notch so as to positively limit the indexing movement whereby accurate registration of the notches with the receptacle supply and the dispenser is insured.

Figure 2:
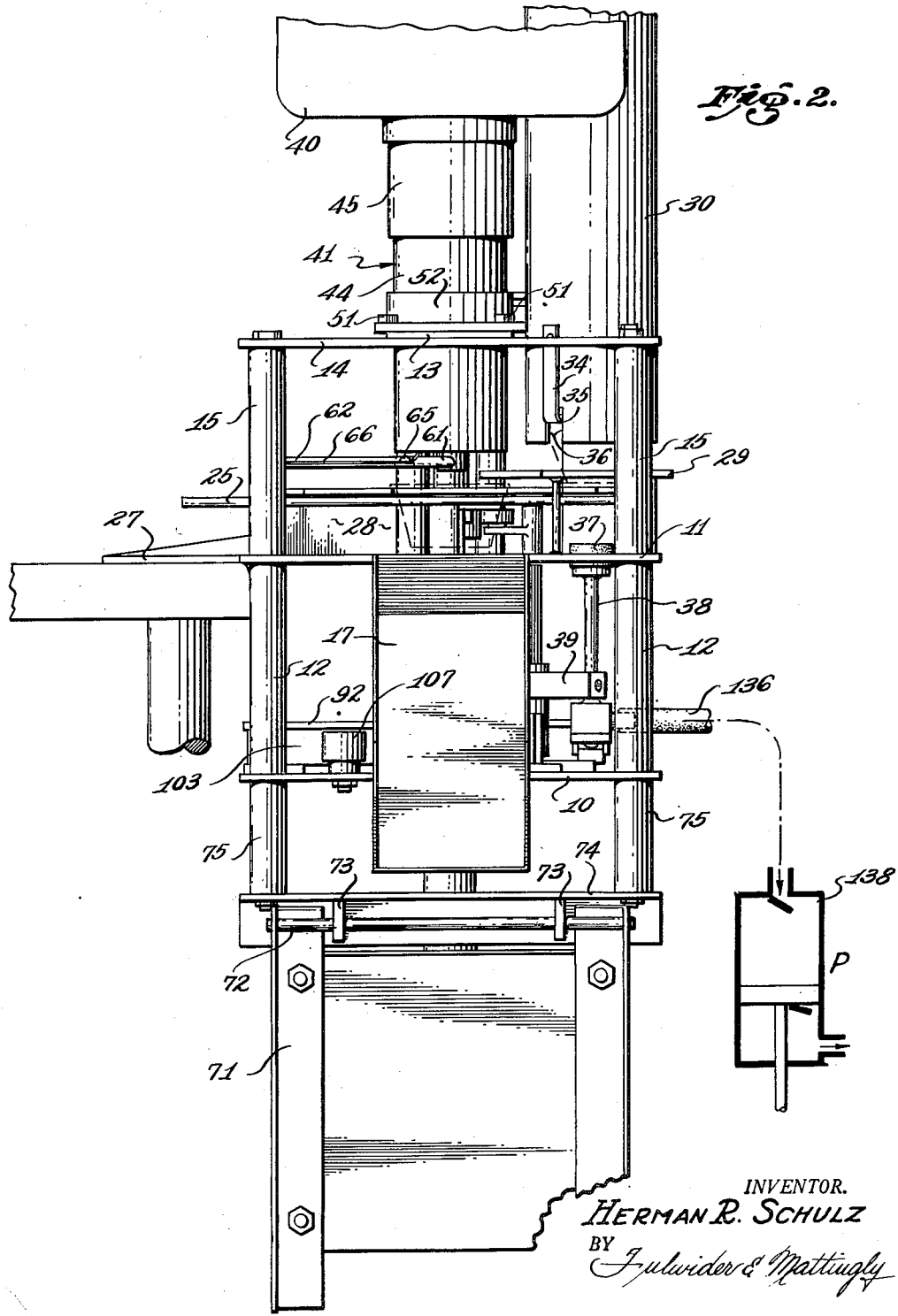
Fig. 2 is a side elevation of the apparatus shown in Fig. 1.

The receptacle feed is also provided for in response to rotation of the shaft 81. A receptacle feed cam 130 constituting a cylindrical type cam is mounted on the shaft 81. Cam 130 has a vertically inclined cam face 131 which is adapted to be engaged by follower 132 carried upon a reciprocating sleeve 133. Sleeve 133 is normally urged in upward position by coil spring 134 and thus the follower 132 is maintained with an upward thrust against the cam surface of the cam 130. The sleeve 133 carries the arm 39 within which the suction tube 38 of the pneumatic receptacle dispenser is mounted. Below the arm 39 the tube 38 is provided with a suction nipple 135 to which is secured a flexible suction tube 136. As indicated in Fig. 2 a suitable suction pump 138 is provided by which reduced atmospheric pressure is maintained in the tube 136 and normally through the tube 38 and the cup 37. Thus when the cup is raised by the spring 134, under the guidance of the cam 130 and into contact with the lowermost receptacle in the chamber 30, such receptacle will be engaged and upon lowering of the receptacle will be withdrawn and located within registering notch of the carrier 20.

For releasing a receptacle so withdrawn, the lower end of the tube 38 is provided with a pivotally mounted valve 139 carried by a valve arm 140 pivotally mounted as at 141 from a bracket extending from an elbow 142 mounted upon the tube 38. The free end of the valve arm 140 is provided with a vertically extending set screw 143, the end of which is adapted to strike the bed 10 when the receptacle feeding mechanism is in its lowermost position. Upon such striking, the arm 140 is pivoted to remove the valve 139 from the bottom of the tube 38 so as to admit atmospheric pressure and to thus release the receptacle for indexing movement with the carrier.

The severing arm 60 is also adapted to be operated by rotation of the main shaft 81. The operating mechanism for the cam 60 includes a vertically extending shaft 150 mounted through the bridge 13 and provided on the lower end thereof with the severing arm 60.

Above the bridge the shaft 150 is provided with an actuating arm 151 carrying a follower 152. Follower 152 is adapted to be engaged by a cam 153 carried upon a stud 154 to which is secured, for rotation therewith, a driving gear 155. Driving gear 155 meshes with a companion gear 156 mounted on the shaft 81, the arrangement being such that upon the rotation of the shaft, the gear 156 will rotate with gear 155 and therewith the stud 154 and the cam 153.

For the purposes of adjusting the dwell period of the severing device at the end of its severing stroke, the cam 153 is formed as a compound cam having upper and lower cam segments 153a and 153b respectively. The segments are secured in relative adjusted position by a securing bolt 156 extending through companion arcuate hole 157 in the segments and engaging the gear 155. By adjusting the relative angular relation of such cams, the severing means may be retained in its actuated position during the ensuing operation cycle.

It will be noted that the gear ratio between gears 155 and 156 is substantially 2 to 1 so that stud 154 and the cam mounted thereon will make only one revolution in response to two revolutions of the shaft 81. Thus after an initial severing operation the member 60 will retain its position shown by dotted lines in Fig. 4 and the next severing operation will be performed by a return stroke the material in the meantime having been extruded between the portion 62 and the wire 66.

As indicated by the wiring diagram of Fig. 10 the motor 70 is controlled by the motor control switch 170 supplied by a suitable power source indicated by the conductors 171. The same source of energy is adapted to supply current for heating the severing resistance wire 66. A switch 172 is provided to control the energization of the wire 66 and the circuit includes a potentiometer 173 together with a transformer 174. By means of the potentiometer the current supplied to the wire 66 may be readily varied in such manner as to conform with varying requirements.

Figure 4:
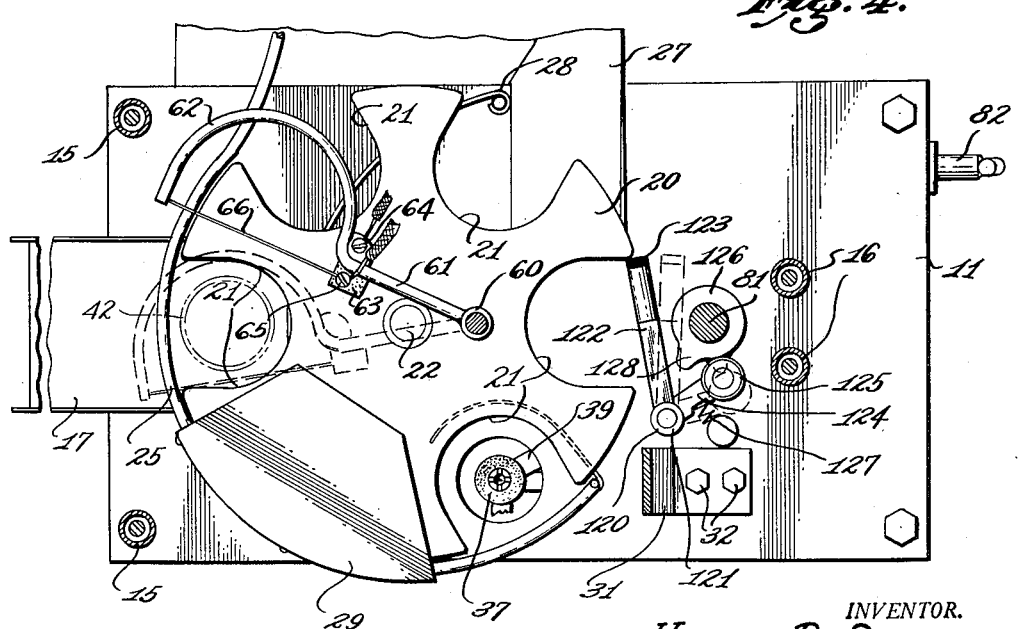
Fig. 4 is a similar view to Fig. 3 taken along line 4—4 of Fig. 1.

From the foregoing it will be seen that when the motor 70 is energized by closing the switch 170 the shaft 81 is rotated to initiate the continuous operating cycles of the device. The receptacles are successively deposited in the successive notches of the carrier and in the course of two successive indexing movements are brought into registration with the supply tube. Accuracy of such registration is insured by engagement of the member 123 with the notch of the carrier opposite the dispensing station. At the dispensing station the severing device is moved to bring the wire 66 through the extruded portion of the material which is thus formed into a unit. The unit is thus accurately located within the receptacle in registration with the bottom thereof without contact with the receptacle walls. The package product is moved by the next indexing operation toward the apron 27. By virtue of the gear ratio for the cam 153 the severing means is retained in the position to which it has been moved as indicated in Fig. 4 during the next indexing movement and is thereafter returned to sever the next successive unit by the return stroke thereof.

It will, of course, be understood that the invention is not limited to the specific combination of instrumentalities herein set forth nor to the specific mechanical construction of such instrumentalities. Numerous changes and modifications in structural features may be resorted to without departure from the spirit or scope of the invention as defined in the appended claims.

I claim:

1. In a machine for packaging ice cream and similar food products, the combination with a freezer unit, of a dispensing station comprising a supply tube having a reduced diameter restricting cylinder connected therewith through which the product is extruded as a continuous column, a compacting baffle disposed transversely of the exit end of the cylinder for longitudinally splitting and compacting the column, means disposed below said baffle for reuniting the column and controlling the extruded shape, a magazine for holding a supply of packaging receptacles spaced laterally from said dispensing station, a carrier for moving packaging receptacles from the magazine one at a time to a position immediately below the column of the product at the dispensing station, and severing means including a transversely movable cutter mounted below said means for severing individual portions from the column for deposit in a packaging receptacle therebelow, and means for effecting operation of said severing means and carrier.

2. In an ice cream and similar food products packaging machine including with a freezer unit the combination of a dispensing station comprising a supply tube through which frozen material can be continuously fed, said tube having a reduced diameter flow restricting cylinder mounted for communication therewith and constituting an elongated restricted passage for the flow of material from the supply tube, a transversely disposed baffle mounted at the outlet end of said cylinder and substantially medially thereof for dividing the material and compacting the same, means mounted below said baffle constituting a discharge opening of a diameter substantially equal to the diameter of said cylinder, said restricting cylinder, baffle and means controlling the physical characteristics of the material, a magazine for holding a supply of packaging receptacles spaced laterally from said dispensing station, a carrier for moving packaging receptacles from the magazine one at a time to a position immediately below the column of the product at the dispensing station, severing means including a cutter transversely movably mounted below said discharge opening for severing individual portions from the column for deposit in a packaging element therebelow, and means for effecting operation of said severing means and carrier.

3. In an ice cream and similar food products packaging machine including with a freezer unit, the combination of a dispensing station comprising a supply tube through which frozen material can be continuously fed, said tube having a reduced diameter flow restricting cylinder mounted for communication therewith and constituting an elongated restricted passage for the flow of material from the supply tube, a supporting cylinder mounted concentrically with said cylinder and providing a support therefor, means mounted at the outlet end of said cylinder for dividing the flow of material therefrom and compacting the same, the lower end of said supporting cylinder terminating in an annular restricting flange downwardly spaced from said means, said flange providing a restricting discharge opening of a diameter substantially equal to the diameter of said restricting cylinder for controlling the final configuration of the dispensed material, said restricting cylinder, means, and restricting flange controlling the physical structure of the material, a magazine for holding a supply of packaging receptacles spaced laterally from said dispensing station, a carrier for moving packaging receptacles from the magazine one at a time to a position immediately below the column of the product at the dispensing station, severing means including a cutter transversely movably mounted below said discharge opening for severing individual portions from the column for deposit in a packaging receptacle therebelow, and means for effecting operation of said severing means and carrier.

HERMAN R. SCHULZ.

REFERENCES CITED

The following references are of record in the file of this patent:

UNITED STATES PATENTS

| Number | Name | Date |
|---|---|---|
| 797,276 | Glauser | Aug. 15, 1905 |
| 1,412,727 | Walsh | Apr. 11, 1922 |
| 1,494,982 | Sides | May 20, 1924 |
| 1,799,755 | Loughridge | Apr. 7, 1931 |
| 1,849,148 | Mojonnier | Mar. 15, 1932 |
| 1,860,646 | Beilgard | May 31, 1932 |
| 2,145,240 | Adams | June 31, 1939 |
| 2,445,713 | Glassner | July 20, 1948 |